United States Patent [19]

Oliver et al.

[11] Patent Number: 5,745,458
[45] Date of Patent: Apr. 28, 1998

[54] OVERLAPPED SPIN-UP PROCESS FOR OPTICAL DISK DRIVE

[75] Inventors: Thomas C. Oliver; David J. Ellis; Leo J. Embry, all of Fort Collins, Colo.

[73] Assignee: Hewlett-Packard Company, Palo Alto, Calif.

[21] Appl. No.: 732,753

[22] Filed: Oct. 18, 1996

Related U.S. Application Data

[63] Continuation of Ser. No. 222,973, Apr. 5, 1994, abandoned.

[51] Int. Cl.$^6$ ............................................. G11B 3/90
[52] U.S. Cl. ................................... 369/54; 369/58
[58] Field of Search ........................ 369/32, 44.27, 369/44.28, 44.29, 47, 48, 50, 54, 88; 360/77.05, 77.02, 73.03, 73.01

[56] References Cited

U.S. PATENT DOCUMENTS

| | | | |
|---|---|---|---|
| 4,700,056 | 10/1987 | Silvy et al. | 250/201 |
| 4,937,440 | 6/1990 | Hofer et al. | 250/201.5 |
| 4,942,564 | 7/1990 | Hofer et al. | 369/58 |
| 5,113,384 | 5/1992 | McDonald et al. | 369/44.29 |
| 5,134,602 | 7/1992 | Baca et al. | 369/32 X |
| 5,185,681 | 2/1993 | Volz et al. | 360/77.05 |
| 5,199,011 | 3/1993 | McDonald et al. | 369/58 |
| 5,255,136 | 10/1993 | Machado et al. | 360/77.02 |

*Primary Examiner*—Paul W. Huber

[57] ABSTRACT

A system and method for simultaneously spinning up an optical disk and performing operations to prepare the optical disk for data access in an optical disk drive system. A controller controls the performance of various disk drive operations in parallel with the acceleration and settling of the optical disk. The spin-up sub-process includes three operational periods for high density media and five operational periods for low density media. Each of these periods corresponds to a different range of spindle speed and stability. First, the optical disk accelerates towards a target speed. During the first operational period wherein the spindle oscillation is greater than a minimum threshold speed variance, operations which are not speed dependent are performed. During the second operational period wherein the spindle is settling and the oscillation is between the minimum and a final threshold speed variance, speed dependent operations are performed. These include reading header information, and performing initial calibrations. When the spindle further settles and the oscillations are less than the final threshold speed variance, speed dependent calibrations which must be performed when the disk media is rotating at the target operational speed are performed.

16 Claims, 9 Drawing Sheets

OVERLAPPED SPIN-UP PROCESS FOR OPTICAL DISK DRIVE

This is a continuation of application Ser. No. 08/222,973 filed Apr. 05, 1994, now abandoned.

BACKGROUND OF THE INVENTION

1. Field of the Invention

The present invention relates generally to data storage, and more particularly, to spin-up processes of optical disk drive and library systems.

2. Related Art

A storage medium is part of a computer's memory wherein programs, work files, and other information reside as digital data. Computer memory is commonly of two types: moving-type memory and non-moving-type memory. Typically, non-moving memory, such as random access memory (RAM), is directly addressed, or accessed, by the computer's central processing unit. In contrast, moving memory, such as a disk drive and magnetic tape unit, is indirectly accessed.

Moving memory generally has much greater data storage capacity than non-moving memory. Moving memory is also typically non-volatile. That is, the data is preserved when power is removed from the memory unit. However, moving memory has substantially longer access times due to the time required to physically position the mechanical components. Moving-type memory is generally used for long-term storage of large programs and substantial bodies of information which are not in constant use by the computer or which are too bulky to be stored in non-moving memory.

Non-moving memory is typically more expensive per unit of memory than moving memory. In addition, non-moving memory has less capacity for a given volume of space than moving memory. However, the most attractive feature of non-moving memory is its speed. Non-moving memory can store information which is in constant use by the computer and which requires immediate access.

The storage media of a moving-type memory are physically alterable objects. That is, the storage media can be magnetized, grooved, pitted, or altered in some detectible fashion to record information. Preferably the storage media is simultaneously physically resilient, portable, inexpensive, of large capacity, and resistant to accidental alteration. The various types of storage media used in moving-type memory for computers include magnetic tape, floppy disks, compact disk Read Only Memory (ROM), Write-Once, Read-Many (WORM) optical disks, etc. Each of these storage media exhibit detectable physical changes to the media representing binary data. To read, write, and erase data on the media, mechanical components are provided which can be directed to the proper location on the physical media to carry out the desired function.

Optical disk drives are systems that support the optical disk moving-type storage media discussed above. Optical disk drive systems are generally stand-alone systems, interfacing with a micro-computer, mini-computer, personal computer, or other type of host processor system. In addition, optical disk drives are utilized in optical disk libraries, referred to as "jukeboxes." Optical disk libraries contain an enclosure which houses a number of optical disks, one or more optical disk drives, and a robotic mechanism (referred to as an autochanger) for transferring the optical disks between their storage locations and a selected optical disk drive.

Optical disk libraries have been designed to provide automated, high capacity data storage and retrieval at a reasonable cost and usability. One of the characteristics of the jukebox system which affects the usability of the system is the data access time. Data access time is the time from when a host processor transmits a data request to the jukebox system to when the optical disk is ready to be accessed. Despite the large data storage capacity of optical disk storage media, the data access time is considerably longer than other forms of storage media. This has prevented optical disk libraries from becoming a practical, cost effective, and usable storage medium.

There are two main processes which contribute to the data access speed in optical library systems. The first process, referred to as the disk selection and retrieval process, is performed by the robotic mechanism and other jukebox components. The second process, referred to as the load process, is performed by the optical disk drive. Each of these processes is discussed below.

The disk selection and retrieval process includes activities associated with the positioning of the robotic mechanism adjacent to the selected optical disk, retrieving the optical disk from its storage location, positioning the selected optical disk adjacent to a predetermined optical disk drive, and inserting the optical disk into an entry port of the optical disk drive. This process is a large contributor to the overall data access time in a jukebox system.

The load process includes two main sub-processes: (1) a load disk sub-process; and (2) a spin-up sub-process. In conventional optical disk drives, the following activities are performed during the load disk sub-process: the optical disk drive receives the optical disk inserted into its entry port by the robotic mechanism, loads the disk onto a spindle, and secures the disk in position for the spin-up sub-process. Since the optical disk is adjacent to the spindle upon placement into the entry port, the disk is moved a short vertical distance down onto the spindle during the load disk sub-process. As a result, this sub-process consumes a minimal amount of load process time, and, therefore, data access time.

The next sub-process in the load process, the spin-up sub-process, includes activities required to make the disk accessible to the host processor for data transfer. Generally, this requires the spinning up of the optical disk to a minimum operational speed, locking all servo loops, and performing calibrations. After calibrations are completed, the optical disk drive is ready to transfer data between the host processor and the optical disk.

FIGS. 1 and 2 illustrate the steps performed during the spin-up sub-process in conventional optical disk drive systems. Referring to FIGS. 1 and 2, the functional steps performed during the spin-up sub-process of conventional optical disk drives are conducted in a serial manner. The spin-up sub-process starts at entry point 102 by which time the disk selection and retrieval process and the load disk sub-process are completed. In other words, the autochanger has placed the selected optical disk into the optical drive and the disk has been loaded onto the spindle before entry point 102.

First, in step 104, the optical disk drive spins up the optical disk to a final speed. The final speed is typically within 0.1% of a target speed, which represents the ideal speed at which the optical disk rotates for performing data access functions. The target speed (revolutions per minute) is determined by the density of the media used in the optical disk. High density media may operated at lower speed than low density media. However, the density of the disk is not known at this point in the spin-up sub-process, and thus it is not possible to determine the target speed. Thus, the optical disk is accelerated to a lower target speed associated with a high density disk media.

Conventional disk drive systems do not proceed with the spin-up process until the optical disk has attained the final speed. This is the minimum operational speed at which the optical disk drive can perform all required operations to prepare the optical disk drive for disk access.

Once the final speed is attained, the optical disk drive in step 106 turns on a laser. In step 108, a focus servo is engaged and the focus is maintained. Then in step 110, a tracking control system is also engaged and the drive maintains tracking control. After all the systems are operational and the disk is spinning at the final speed, the drive, in step 112, then reads the optical disk to determine the position of the laser on the disk. Processing continues through flowchart connector A 113 to step 202 in FIG. 2.

In the next step, step 202, the system determines the media type. This includes such characteristics as the media density (for example, high density 1300 MB or low density 650 MB), sector size (for example, 1024 or 512 bytes), and media type (for example, re-writable (R/W) or write once/read only (WORM)). If the media type is low density, as determined by decision block 204, then the optical disk is accelerated to a higher final speed in step 206.

In step 208, the optical drive system performs the necessary calibrations once the disk has reached the final speed, whether accomplished at step 104 or step 206. These include the calibration and setting of tracking gain, focus offset, read channel gains, read/write verification, etc.

In conventional disk drive systems, the time for the optical disk to reach the initial final speed in step 104 is approximately 1 to 2 seconds. The remaining steps shown in FIGS. 1 and 2 consume from 2 to 3 seconds. Thus, the spin-up sub-process of conventional optical drive systems requires from 3 to 5 seconds to complete. The spin-up sub-process consumes the greatest amount of load process time since, as described above, the load disk process consumes a minimal amount of time.

What is needed, therefore, is an optical disk drive system that has a reduced spin-up sub-process time, thereby reducing the disk drive load process time. This, in turn, will reduce the data access time of jukebox systems containing such disk drives.

SUMMARY OF THE INVENTION

The present invention is directed towards the optimization of an optical disk drive loading process to decrease the data access time in stand-alone optical disk drives and optical disk drive library systems. The present invention performs the various operations to prepare the optical disk and optical disk drive for data transfer in parallel with the acceleration and settling of the optical disk. This overlapping of preparatory operations with optical disk acceleration and settling reduces the overall time required for a user to access the optical disk. This is a significant improvement over conventional optical disk drive systems which perform the various preparatory operations after the optical disk has achieved the desired final speed.

After the selection and retrieval process is completed, the load process is performed. The first sub-process, the load disk sub-process, is performed to load and secure the disk onto the spindle Then, the spin-up sub-process of the present invention is executed to accelerate the disk to its final speed and perform operations to prepare the disk for data reading, writing, and erasing.

The spin-up sub-process of the present invention preferably comprises five operational periods, two of which are performed only when the optical disk is of low density media. Each of these periods corresponds to a different range of spindle speed and stability. Specific operations are performed during each of these periods by the optical disk drive.

In the first operational period the spindle is initially accelerated from a stationary position towards a target speed of 2400 RPM. The first operational period ends when the spindle speed reaches a minimum threshold speed variance of 0.2% of the target operational speed, or 2400 RPM±0.2%. During this acceleration, three operations are performed: (1) turning on the laser source; (2) lock the focus servo control system to acquire and maintain focus of the disk; and (3) lock the tracking servo control system to acquire and maintain tracking control of the disk.

Once the servo system determines that the spindle has achieved the minimum threshold speed variance, the second operational period of the spin-up sub-process occurs. The second operational period continues until the spindle oscillations reach a final threshold speed variation of 2400 RPM±0.1%. Thus, the second operational period occurs when the spindle speed is from 2400 RPM±0.2% to 2400 RPM±0.1%. While the servo system continues rotating the spindle at the target operational speed, the following three operations are performed. First, header information is accepted to maintain position of the tracking beam at the same radial position on the disk. Then, header information is read to determine the type of media, including media density and sector size. Next, initial calibrations which are speed dependent are performed.

The third and fourth operational periods of the spin-up sub-process are performed only when the disk is a low density optical disk. If the controller determined that the disk is low density media, then the disk is accelerated to the higher target operational speed and allowed to settle within the tolerances associated with the higher operational speed.

Once the final threshold speed variation has been obtained, the disk is spinning at the target operational speed for the associated disk media. The optical disk speed and stability are maintained while final calibrations are performed. These calibrations are speed dependent calibrations and must be performed when the disk media is rotating within the final speed threshold variance of the target operational speed. Data may now be transferred between optical disk and the requesting host processor.

Further features and advantages of the present invention, as well as the structure and operation of various embodiments of the present invention, are described in detail below with reference to the accompanying drawings.

BRIEF DESCRIPTION OF THE FIGURES

The invention is best understood by reference to the Figures wherein references with like reference numbers indicate identical or functionally similar elements. In addition, the left-most digits refer to the figure in which the reference first appears in the accompanying drawings in which.

DETAILED DESCRIPTION OF THE PREFERRED EMBODIMENTS

I. Introduction

The present invention is directed towards the optimization of the optical disk drive loading process to decrease the data access time in stand-alone optical disk drives as well as optical disk drive library systems. The present invention performs the various operations to prepare the optical disk and optical disk drive for data transfer (read, write, and erase) in parallel with the acceleration and settling of the optical disk. Thus, optical disk drives implementing the present invention become available to transfer data with a host processor soon after the host computer requests the transfer of such data.

This overlapping of preparatory operations with the spin-up and settling of the optical disk reduces the overall time required for a user to access the optical disk. This is a significant improvement over conventional optical disk drive systems which perform the various preparatory operations after the optical disk has achieved the desired final speed.

II. System Environment

Figure 1:
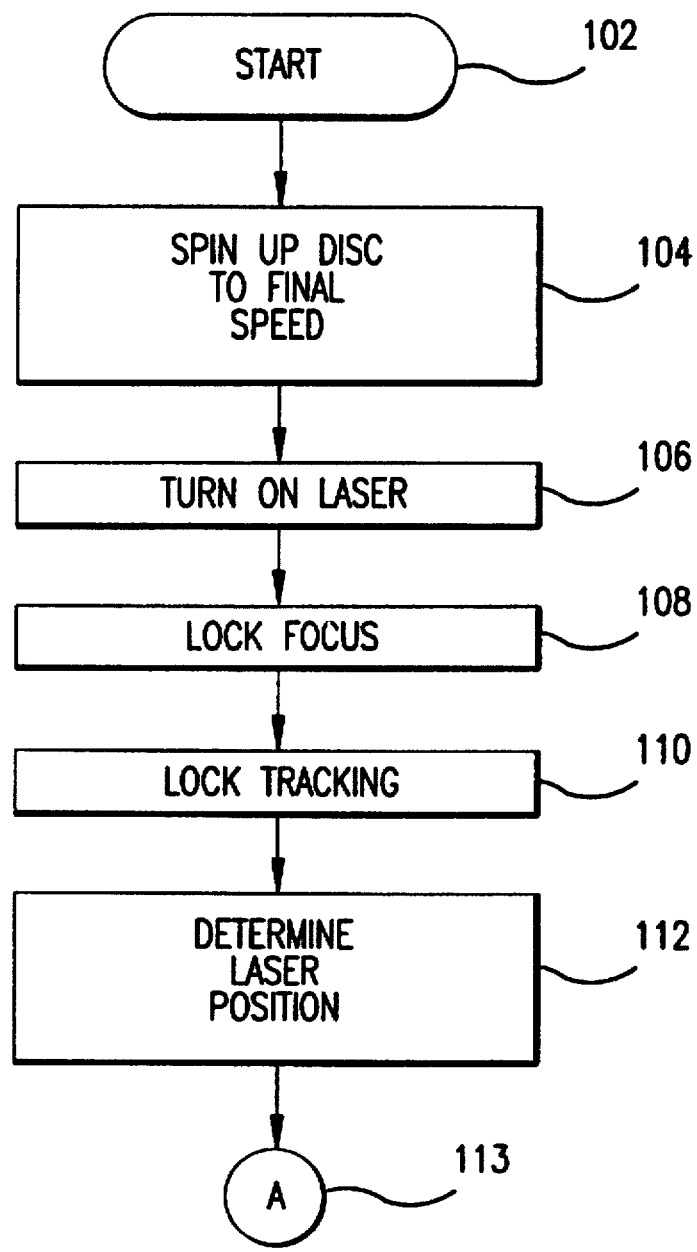
FIG. 1 is a flowchart of a portion of the spin-up process in conventional optical disk drive systems.
Figure 2:
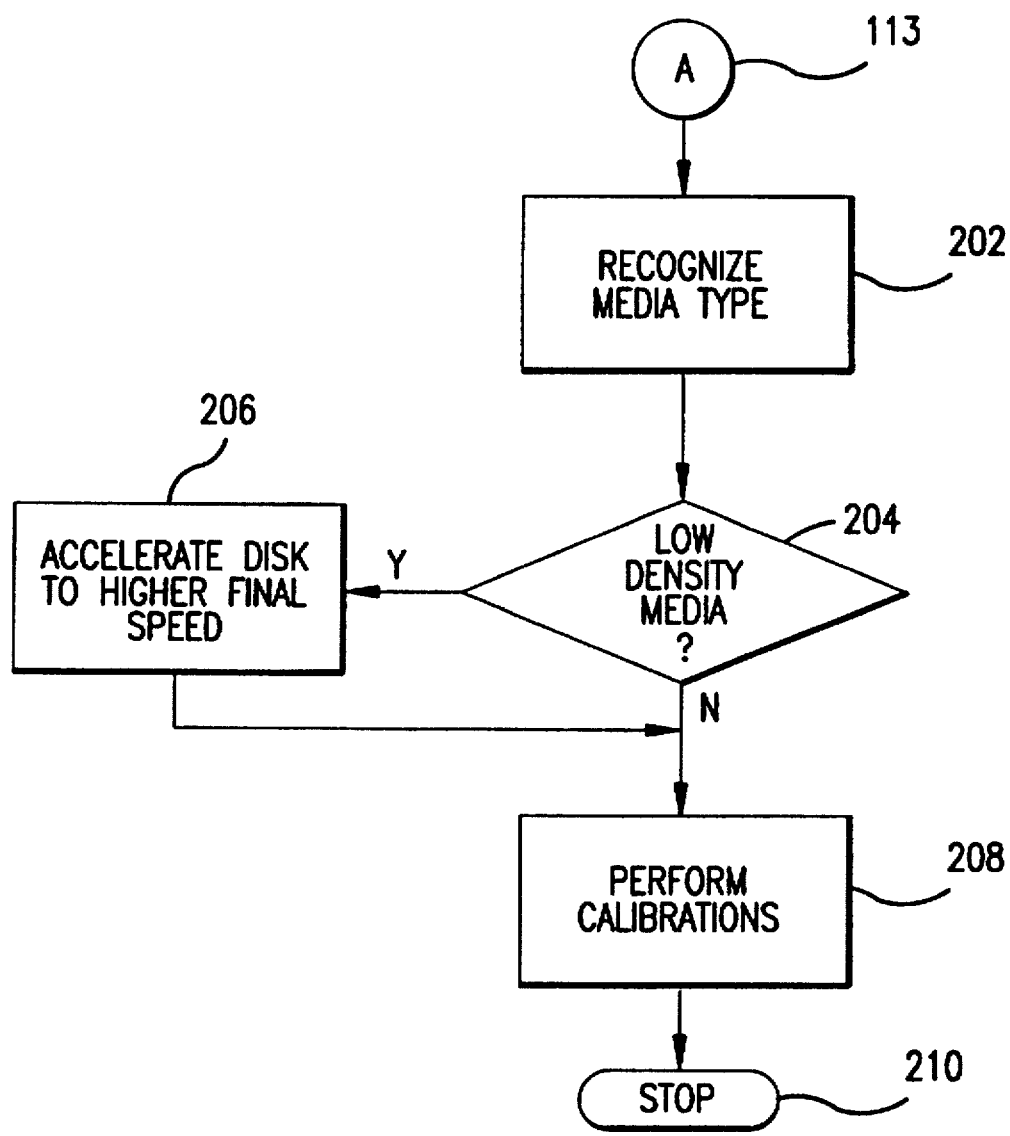
FIG. 2 is a flowchart of a remaining portion of the spin-up process in conventional optical disk drive systems.
Figure 3:
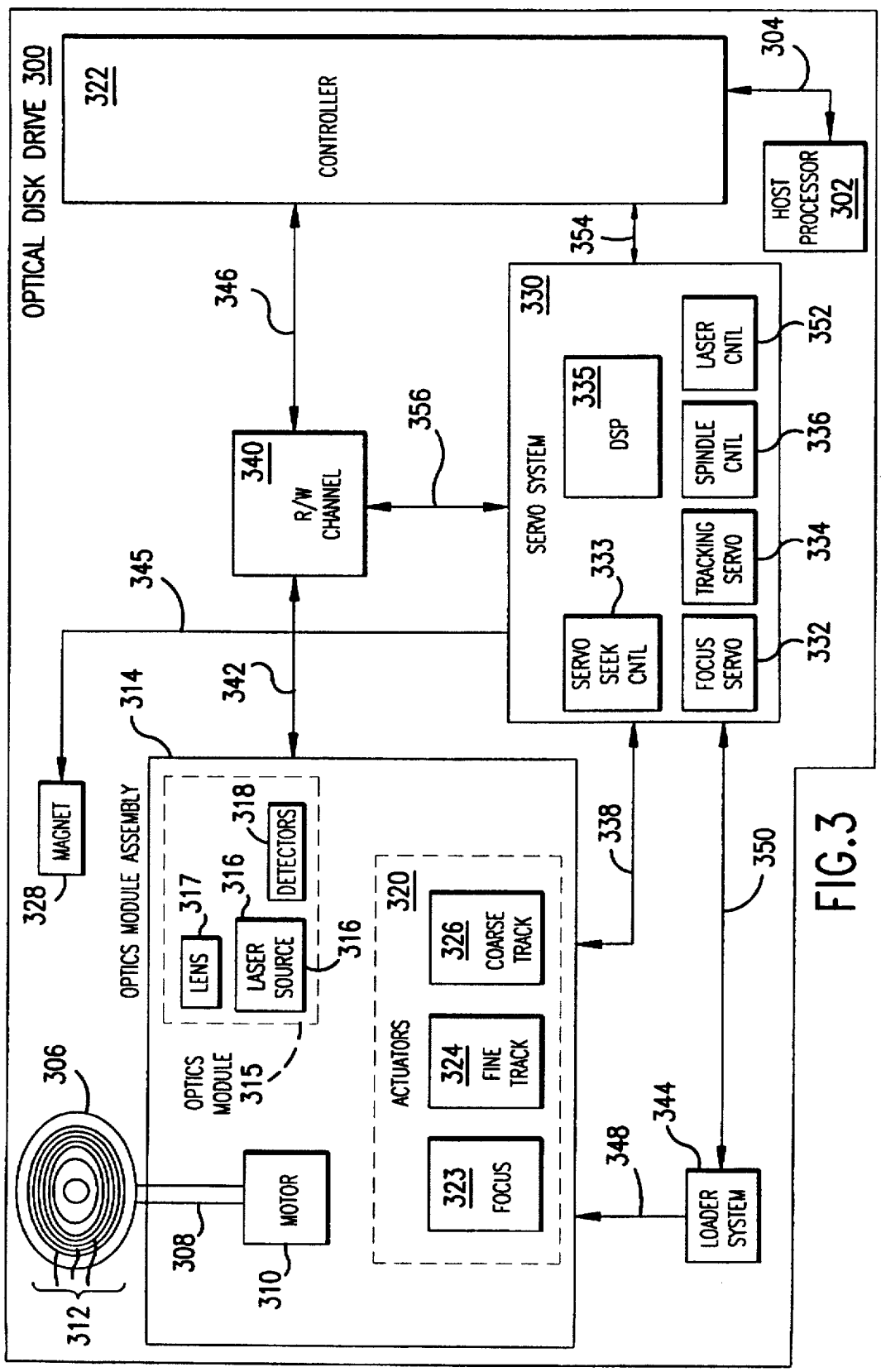
FIG. 3 is a block diagram of an optical disk drive system in accordance with the preferred embodiment of the present invention.

FIG. 3 is a block diagram of an optical disk drive system 300 implementing the overlapped spin-up sub-process of the present invention.

Figure 4:
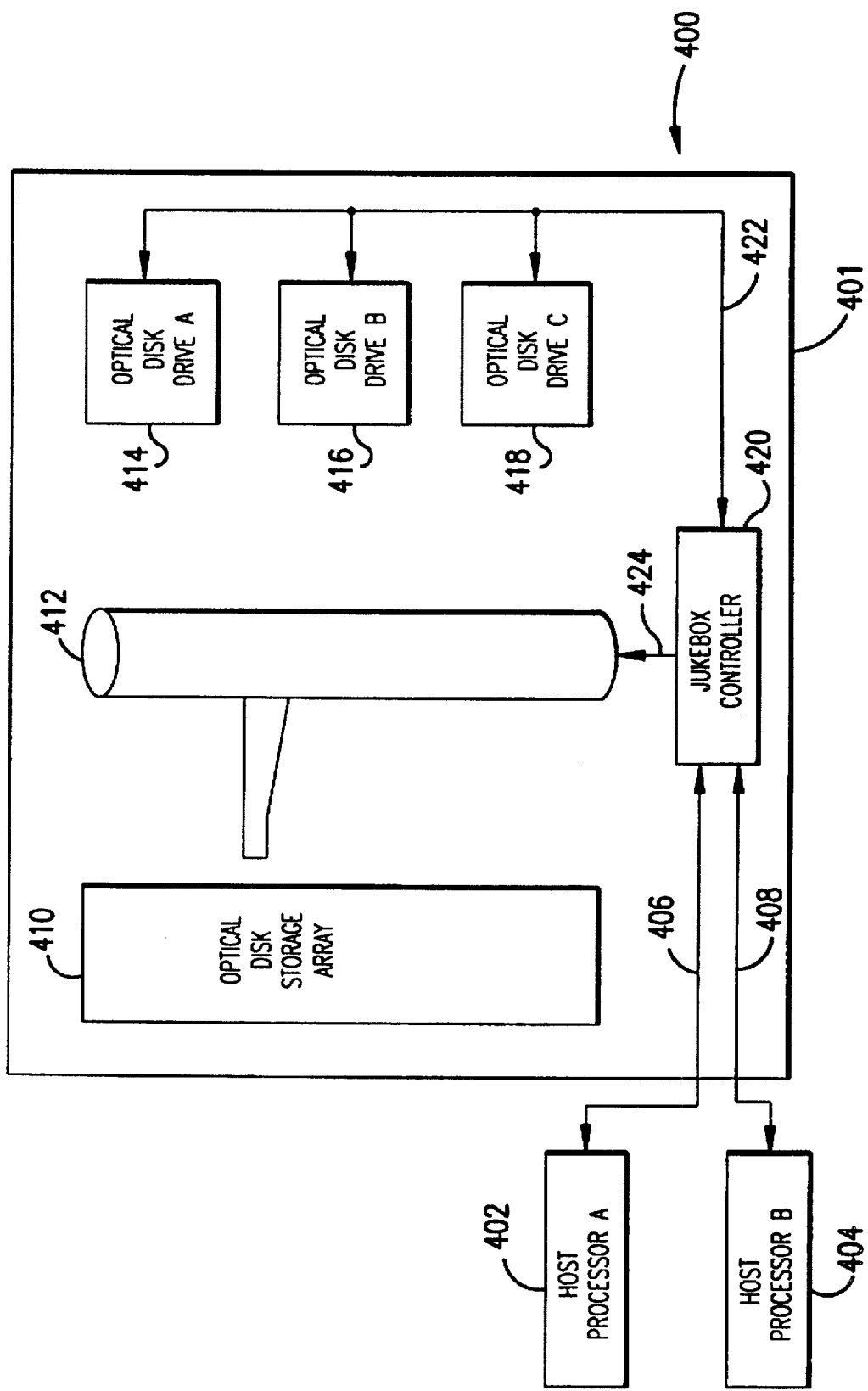
FIG. 4 is a block diagram of a jukebox system in accordance with the preferred embodiment of the present invention.

FIG. 4 is a block diagram of an optical library system 400 utilizing such an optical disk drive. Referring to FIGS. 3 and 4, the architecture and operation of optical disk drive 300 and optical library system 400 are described below.

Generally, optical disk drive 300 includes optical, mechanical, and electrical systems to read, write, and erase data on an optical disk 306. Optical disk drive 300 may be a stand-alone system, as illustrated in FIG. 3 or may be part of an optical library system, as shown in FIG. 4. Typically, when used as a stand-alone system, optical disk drive 300 provides large data storage capacity for a host processor 302. Host processor 302 may be any type of computer system, such as a micro-computer, mini-computer, personal computer, etc. In the preferred embodiment of the present invention, data and commands are transferred between host processor 302 and optical disk drive 300 via a small computer system interface (SCSI) 304. The operation of optical library system 400 is first described, followed by a description of the components of optical disk drive 300.

Referring to FIG. 4, a block diagram of an optical library system 400 utilizing the present invention is illustrated. Optical library system 400, referred to as a "jukebox," provides automatic data storage and retrieval utilizing a quantity of optical disks. Generally, a jukebox contains an enclosure which houses numerous optical disks, one or more optical disk drives, and a robotic mechanism for transferring the optical disks between their storage locations and a selected optical disk drive. An example of an optical library system 400 is the HP-C1710T, manufactured by Hewlett Packard, Greeley, Colo., U.S.A., fully described in U.S. Pat. Nos. 5,043,962 and 5,010,536 to Wanger et al., both of which are herein incorporated by reference in their entirety.

A plurality of host processors 402, 404 are shown connected to jukebox 400. Host processor A 402 and host processor B 404 are connected to jukebox 400 by means of control/data paths 406 and 408, respectively. A plurality of host processors can be interconnected to jukebox system 400, but only two host processors 402 and 404 are illustrated for simplicity. Jukebox 400 stores a plurality of optical disks (not shown), such as the 3M Rewritable Optical Disk Cartridge manufactured by 3M, Minneapolis, Minn., U.S.A. However, as one skilled in the relevant art will find apparent, any optical disk meeting the ANSI X3.212–1992 and subsequent optical disk standards may be implemented in jukebox 400.

Jukebox 400 stores 16, 32, 144, or some other quantity of optical disks, depending on the capacity of the particular system, and contains a robot mechanism 412 that functions to retrieve and return the optical disks from storage cells (not shown) contained in optical disk storage array 410. After retrieving an optical disk, robotic mechanism 412 loads the disk on a selected one of optical disk drive systems 414, 416, 418. Optical disk drives 414, 416, and 418 are analogous to optical disk drive 300. Robotic mechanism 412 is controlled by jukebox controller 420 via control line 424. Optical disk drive A 300, optical disk drive B 416, and optical disk drive 418 are connected to and are controlled by jukebox controller 420 via control/data path 422.

In addition to controlling the operations of robot arm mechanism 412 and optical disk drives 300, 416, and 418, jukebox controller 420 functions to interface optical library system 400 in transparent fashion to host processors 402 and 404 by converting data access command messages into optical disk retrieval commands. These optical disk retrieval commands are then transmitted via control path 424 to robotic mechanism 412 via control/data path 422 to retrieve a selected optical disk and place it in the entry port of a selected optical disk drive. Controller 420 determines that the selected optical disk drive has received the selected optical disk. The selected optical disk drive then automatically performs the load process and begins data transfers with the requesting host processor in a manner described below.

II. System Architecture and Operation

Referring to FIG. 3, optical disk drive 300 is adapted to receive and perform operations on optical disk 306. Optical disk 306 is positioned on a spindle 308 and rotated by a motor 310. Binary data is located at discrete bit positions (not shown) aligned adjacent to each other along elongated servo track 312 which is disposed on the surface of disk 306. In the preferred embodiment of the present invention, optical disk 306 includes a single servo track 312 which is spirally positioned on the optical disk 306. However, as one skilled in the relevant art would find apparent, the present invention may be implemented in optical disk drive systems configured to operate on optical disks having a plurality of concentrically positioned servo tracks such as those illustrated in FIG. 3.

The optical disk consists of a number of tracks along which information is recorded. The location of the information is identified by track and sector designation relating to a coordinate system for locating data. Headers are impressed and are positioned in a periodic fashion to divide optical disk 306 into sectors. Each header contains unique positional information (track, sector, etc) which optical disk drive 300 reads to determine where a laser is positioned on disk 306. Data is stored along the servo track, between the sectors. The headers and spiral can never be altered and are read back using constructive and destructive interference principals. The cartridge shape and disk characteristics conform to current and potential future industry standards (for example, ISO & ANSI standards for optical disks).

Different classifications have been established for optical disk media. The more common media classifications are Read Only Memory (ROM), Write Once, Read Many (WORM), and Read/Write (R/W). A distinguishing feature among classifications is the ability or inability to repeatedly write data to the media. ROM media may never be written to after manufacture and may be read an infinite number of times. ROM optical disk media are typically used in music (compact disks) and bulk data applications. Data can be written to WORM optical media only a single time and can be read an infinite number of times. WORM optical media is typically used in archival applications. R/W optical media can be written to and read from an infinite number of times. Thus, in contrast to ROM and WORM optical media, R/W media may be used in any application.

There are various methods that can be used to write and read data from WORM and R/W optical disks. For example, for a WORM disk, an ablative process can be used wherein a laser is used to burn holes into the media surface. Another process, referred to as the phase change process, utilizes a laser to melt the media surface. In the preferred embodiment of the present invention, a magneto-optical (MO) approach is utilized for reading, writing, and erasing data from both, R/W and WORM media.

Magneto-optic data recording technology combines the erasability features of magnetic data storage systems with the high data storage capacity of optical systems. Magneto-optic disks are also transportable; they can be easily transferred between optical disk drives 300, 416, 418, and optical disk storage array 410 in jukebox 400. Since the reading, writing, and erasing operations are performed with a laser beam rather than magnetic heads, magneto-optic disk 306 has a longer life, higher reliability, and are relatively immune to physical wear. The principles of magneto-optic technology are well known to a person skilled in the relevant art.

The magnetic fields of all bit positions in an unwritten optical disk will generally be oriented with north poles pointing down to represent digital zeros. When writing information, the bit positions will be subjected to a write magnetic bias field from bias magnet 328 and heated by a high intensity laser beam generated by laser source 316. The orientation of the magnetic fields at the written bit positions having a logical "1" value will reverse to north poles up. Bit positions are erased (or reset to a logical "0" value) by subjecting them to an erase bias field of the opposite polarity, and again heating the bit position. The magnetic field orientation at the erased bit positions will then reverse and switch to north poles down.

Data is read from magneto-optic disk 306 using a low-power or read intensity laser beam (not shown). The reflection characteristics of the optical disk 304 depend upon the local magnetic domain state. Because of the well known magneto-optic phenomenon known as the Kerr Effect, the polarization of a laser beam impinged upon the bit positions will be rotated as a function of the magnetic orientation of the bits. The changes in the reflected polarity of the incident radiation returning from the surface of the optical disk enables opto-electronic detector circuitry located in optical module assembly 314 to reflect the orientation of the magnetic dipole in each local region. Opto-electronic detector circuitry 318 measures selected phase characteristics of the polarized light reflected by the region. Thus, each local region can represent one piece of binary data with the orientation of the magnetic dipole being associated with the data value. In optical disk drive system 300, the information is optically detected by orienting a read/write head (not shown) over the center of a track 312 while disk 306 spins underneath the head. The read/write head carries a laser source 316, an objective lens 317 for focusing the laser beam, and optical detectors 318 for developing positioning signals for the objective lens 317. In the preferred embodiment of the present invention, laser source 316, opto-electronic detector circuitry 318, and objective lens 317 are packaged in a single optics module 315.

Actuators 320 include three types of actuators used to position the laser on the disk surface. They are focus actuator 323, for focusing the laser to a point on disk 306; fine tracking actuator 324, for positioning the focused laser beam 340 within a spiral groove on the disk; and coarse tracking actuator 326, for positioning both the above-mentioned actuators at a radial position on optical disk 306.

Spindle motor 310 is used to accelerate and decelerate optical disk 306 and maintain constant rpm. The top of motor 310 accepts the disk's metal hub and clamps the disk on to the spindle motor through magnetic attraction. Optics module 315, actuators 320, and spindle motor 310 are included in optics module assembly 314.

Bias magnet 328 is an assembly which contains a cylindrical magnet which rotates along its long axis. Bias magnet 328 is magnetized such that the one side of its long axis is North and the other is South (2 poles). Bias magnet 328 is positioned near the surface of optical disk 306 and is rotated to provide the appropriate bias field for writing data to optical disk 306.

Optical disk drive 300 includes a focus servo system 332 for driving objective lens 317 about a focus axis to keep the laser beam properly focused on disk 306. A tracking servo system 334 is also used to drive objective lens 317 along a tracking axis perpendicular to servo tracks 312, and to maintain the laser beam centered over a desired servo track. Tracking and focus servo systems 334, 332 for optical disk drives are well known to persons skilled in the relevant art. For example, common tracking and focus servo systems for optical disk drives are described in commonly owned U.S. Pat. No. 4,700,056 to Silvy et al., herein incorporated by reference in its entirety.

The same laser source 316 is used to perform read, write, and erase operations. Distinct power levels exist for each of these operations. Close maintenance of the focal point at the optical disk surface is necessary to bring sufficient energy to a local region. This is particularly true for write and erase operations. Because the surface of optical disk 306 is not perfectly flat, the focal point must be constantly moved to maintain focus of the beam at the surface of the disk. Movement of the focal point is achieved by controlling the movement of objective lens 317.

Electro-optical detectors 318 includes an array of optical sensors which produce output signals in response to the laser light reflected by the surface of optical disk 306. The radial distribution of energy around the central axis of the laser beam is functionally related to the output signals from the sensors. The output signals can thus be related to the focus and tracking position.

Controller 322 contains a microprocessor system, data buffering components, data error detection electronics and encode/decode electronics which enable controller 322 to transform commands received from host processor 302 into lower level drive operations, such as seek, read, write, erase, and verify operations. As discussed above, controller 322 interfaces with host processor 302 via a SCSI interface 304. The main functions of controller 322 are the coordination of the operation of a servo system 330 (discussed below) and read/write channel 340 (also discussed below).

Servo system 330 includes electronics and firmware to perform all functions related to the control of optics module assembly 314, bias magnet 328, R/W channel 340, and loader system 344. Servo system 330 includes a laser servo control system 352 for controlling laser source 316; a focus servo control system 332 for controlling focus actuator 322; a tracking servo control system 334 for controlling fine tracking actuator 320 and coarse tracking actuator 326; a seek servo control system 333 for controlling fine and coarse tracking actuators 324, 326 to achieve large movements in laser travel; and a spindle servo control system 336 for controlling spindle motor 310. Of these, the primary function of servo system 330 is the accurate focusing and tracking of the laser beam within a servo track 312 on the surface of optical disk 306. Laser servo control system 352, focus servo control system 332, tracking servo control system 334, spindle servo control system 336, and seek servo control system 333 operate under the control of a digital signal processor (DSP) 335. Digital signal processor 335 can be programmed to perform operations in response to commands received from controller 322 via control line 354.

Read/Write (R/W) channel 340 provides an interface with the opto-electrical detectors 318 and laser 316 of optical module assembly 314. When data is being written to optical disk 306, R/W channel 340 essentially controls the on/off operation of laser source 316. When data is read from optical disk 306, R/W channel 340 amplifies the read signals coming from optical detectors 318 in the optics module assembly 314 via signal line 342. R/W channel 340 then conditions the read signals to filter out noise and determines the time between peak signal amplitudes.

During read operations, controller 322 decodes the data which is read from optical disk 306 and performs error correction operations to verify the integrity of the data. Controller 322 then transfers the data to host processor 302. During write operations, controller 322 encodes data received from host processor 302 via SCSI interface 304 and supervises the write process. Controller 322 also controls the operators of the present invention (discussed below).

Controller 322 controls the operations performed by the optical drive components to perform the load process, including the load disk sub-process and the spin-up sub-process. These functions include: (1) loading of optical disk 306 on spindle 308; (2) the acceleration of optical disk 306; (3) the acquiring of focus and tracking; (4) the positioning of the laser to a particular location on optical disk 306 (seeking); and (5) the performance of calibration functions.

III. Spin-Up Sub-Process

Similar to the conventional optical disk systems described above, before the spin-up sub-process of the present invention is invoked, a host processor 402, 404 has issued a request to jukebox 400 to access data located on a particular optical disk. The selection and retrieval process is then executed and an optical disk is inserted into a particular disk drive, such as optical disk drive 300. The load disk sub-process is then executed and optical disk 306 is loaded onto spindle 308. The spin-up sub-process is then executed to accelerate optical disk 306 to its final speed and to perform operations to prepare optical disk 306 to transfer data between it and the requesting host processor.

As discussed above, there is a need to decrease the data access time in jukebox systems to make them a more usable, practical, and time efficient means of data storage. Of the various processes and sub-processes which are performed to ready an optical disk and drive for data transfer, the inventors have discovered a means for overcoming the inefficiencies in the spin-up sub-process of the optical disk drive load process in conventional optical disk drive systems.

Due to the relative mass of spindle 308, motor 310, and optical disk 306, there is a resulting inertia which prevents optical disk 306 from immediately obtaining a desired target speed. That is, the system requires that the spin-up sub-process continue for a certain amount of time to allow the inertia-induced oscillations to dampen, thereby allowing optical disk 306 to settle at, and maintain, a target speed. The performance of operations during the spin-up sub-process are generally dependent upon the speed (rotational speed in RPM) and stability (percent tolerance of oscillation) of optical disk 306. Speed variations influence the point in the spin-up sub-process at which these operations can be performed. Consequently, conventional optical disk drive systems perform spin-up operations after optical disk 306 has settled at the target speed, such that there are essentially no speed variations.

The inventors have determined that certain optical disk preparation operations, which are typically performed after the optical disk has reached the target speed, do not require optical disk oscillations to be maintained at the strict tolerances associated with the target speed. Certain of these operations may be performed at virtually any time during the spin-up sub-process. Certain other operations may be performed while there are oscillation which are slightly greater than those associated with the target speed. They have also determined that, to be performed accurately, other operations require that there be little or no oscillations in the spindle speed. That is, the optical disk must be maintained at the target speed and be stable. This has resulted in the inventors dividing the spin-up sub-process into separate operational periods, each corresponding to a different range of spindle speed and stability. Specific operations are performed during each of these periods by optical disk drive 300.

Figure 5:
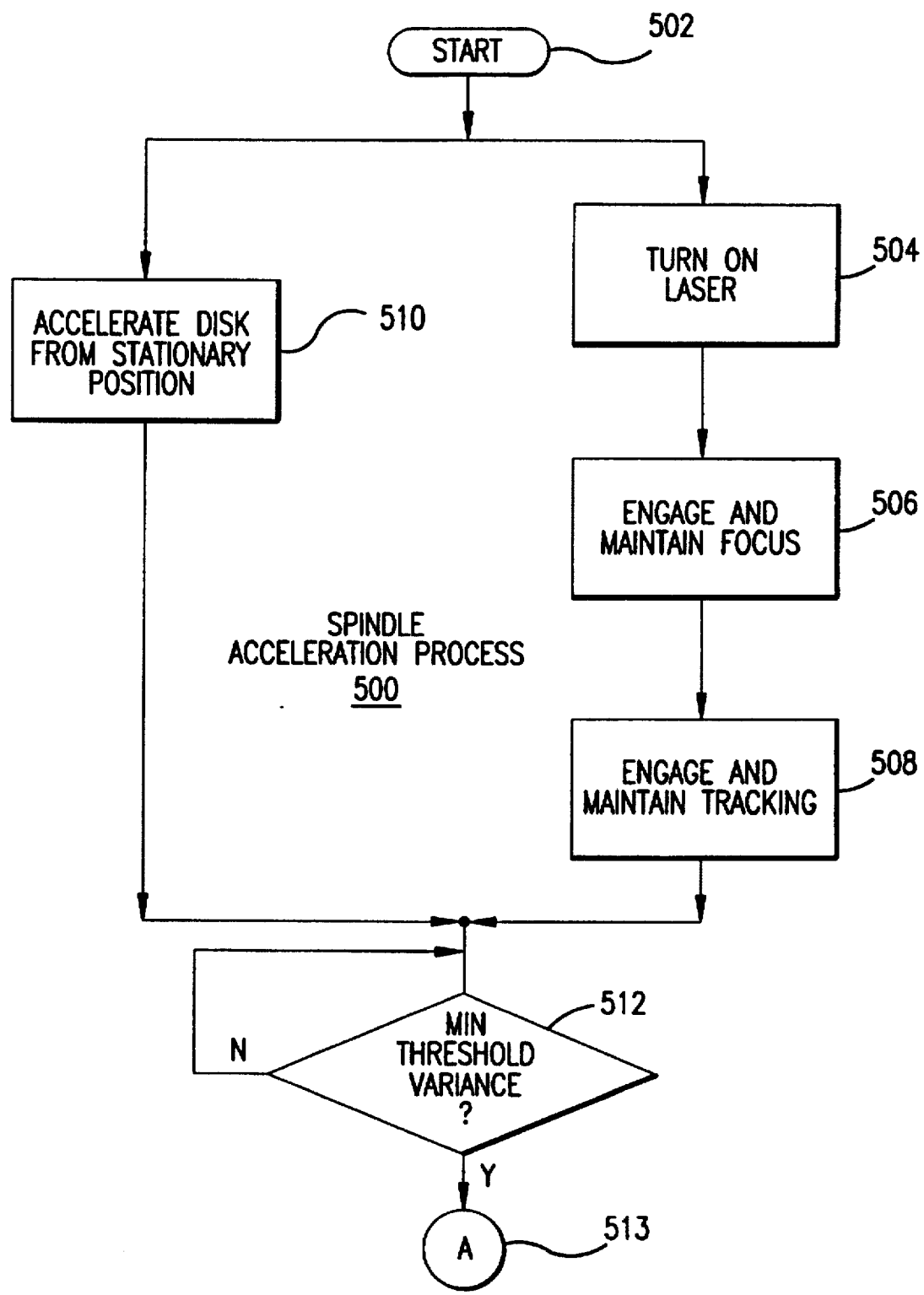
FIGS. 5–7 present a flowchart of the steps performed in the preferred embodiment of the spin-up process of the present invention.
Figure 6:
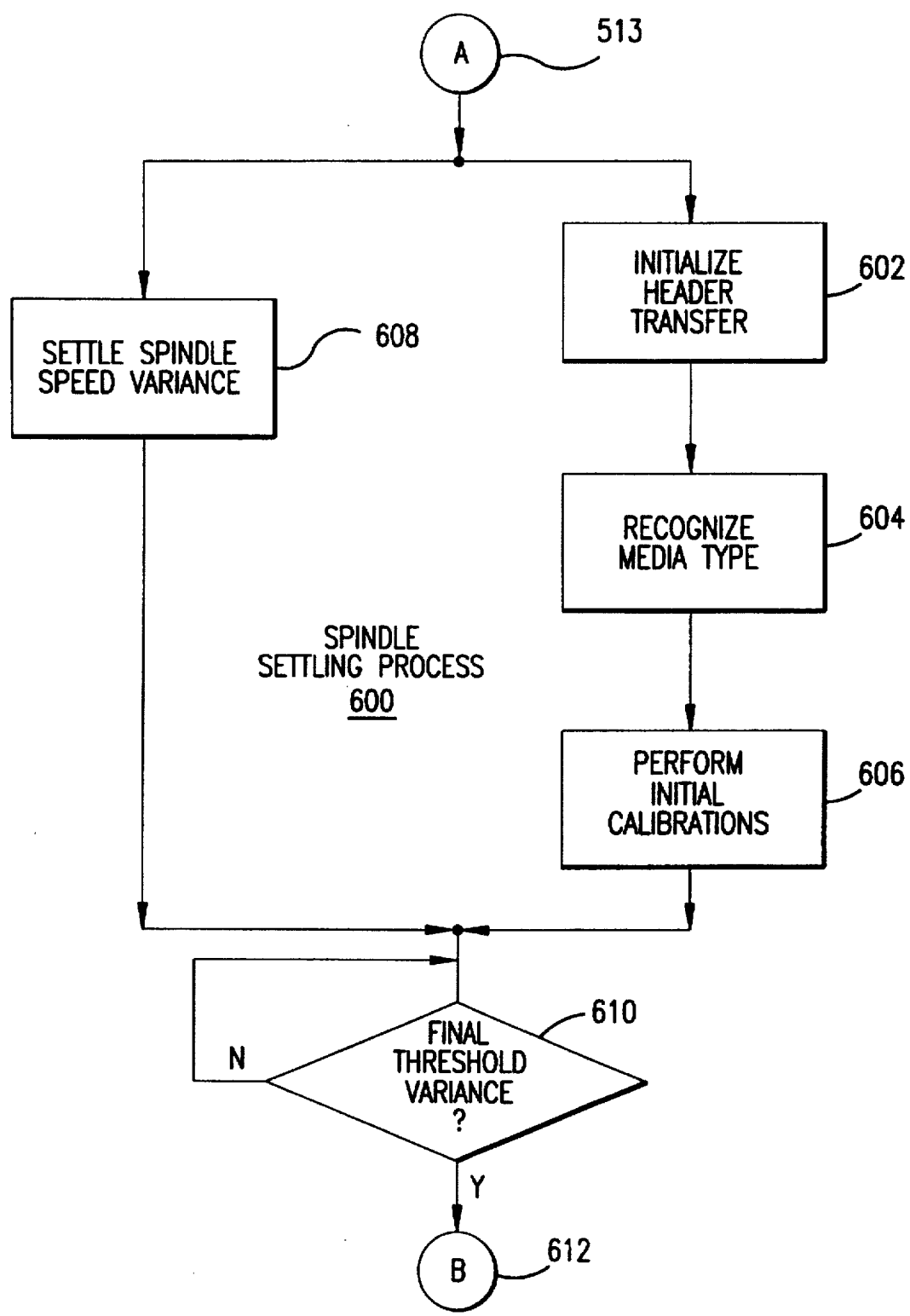
Figure 7:
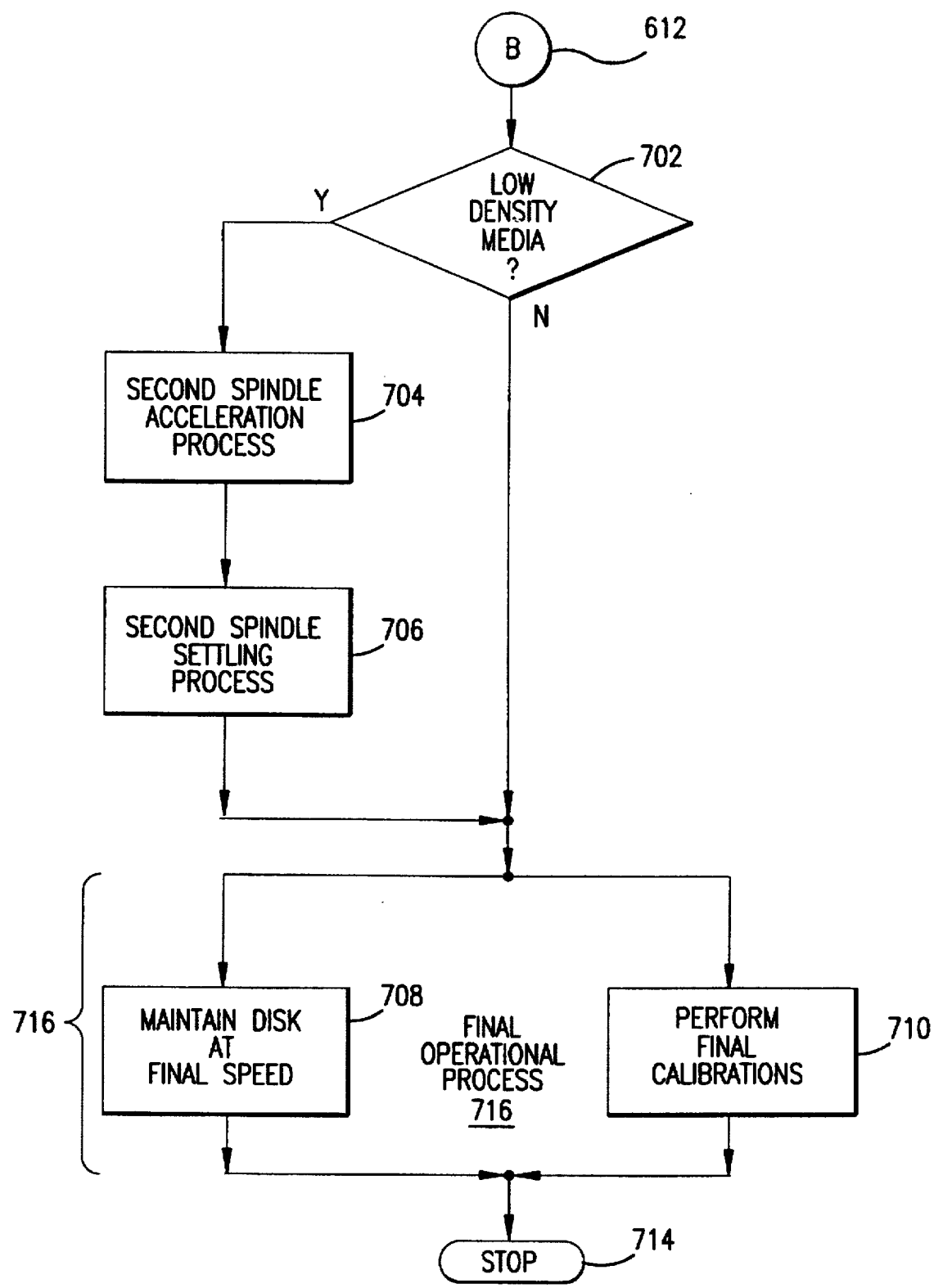
Figure 8:
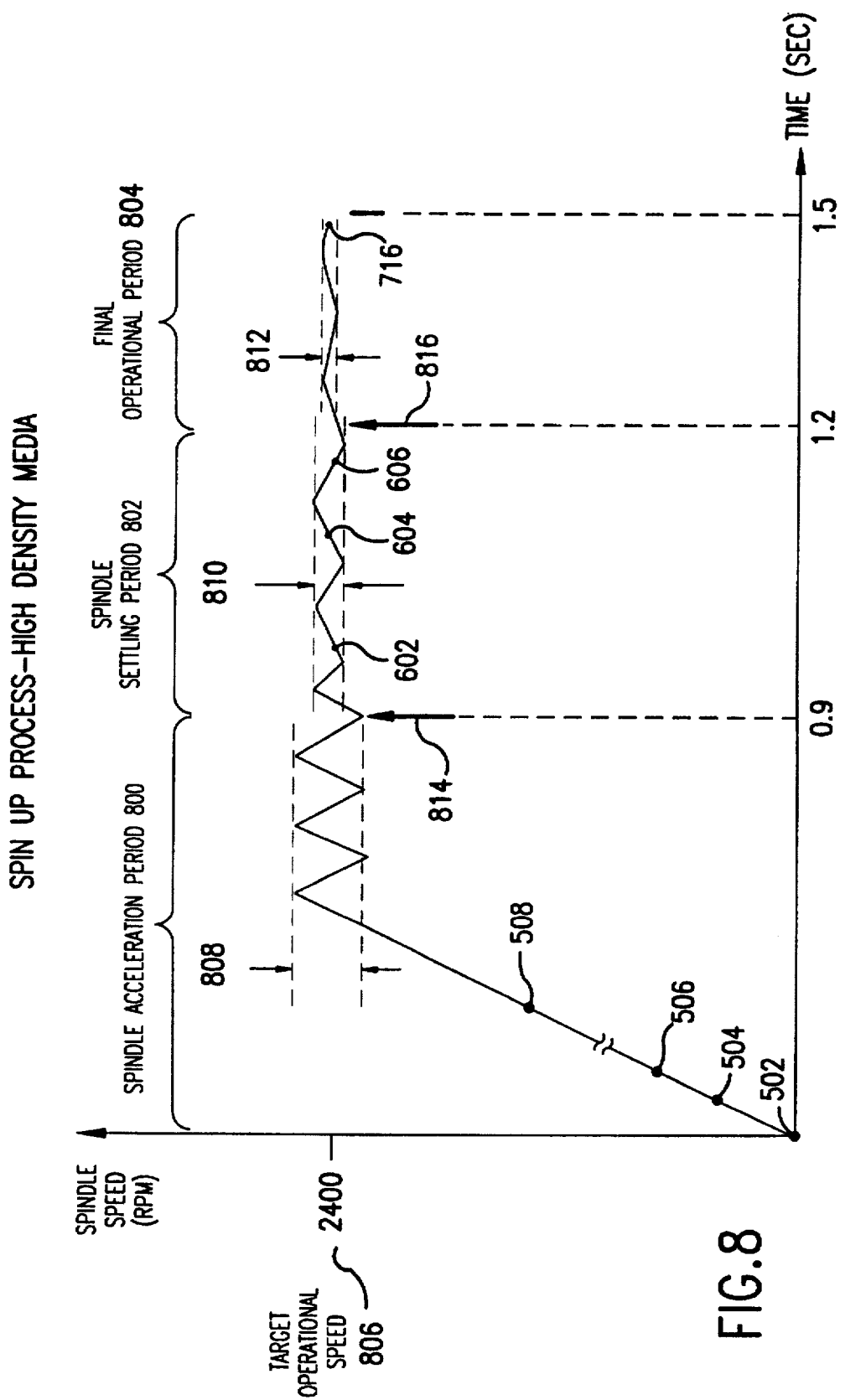
FIG. 8 is a graph of the relationship between the spindle speed and time illustrating the points in the spin-up process wherein the steps illustrated in FIGS. 5–7 are performed for high density media.
Figure 9:
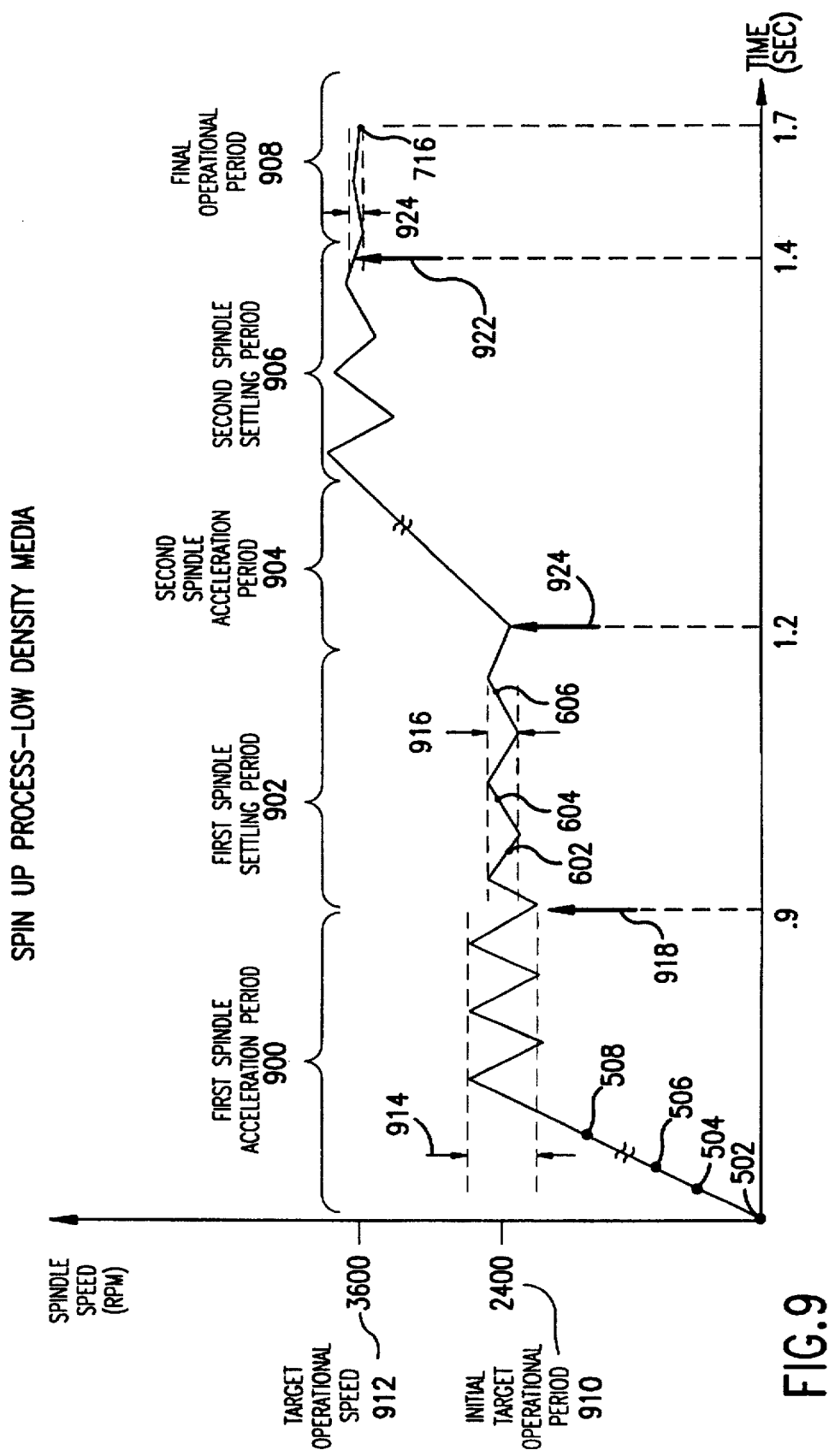
FIG. 9 is a graph of the relationship between the spindle speed and time illustrating the points in the spin-up process wherein the steps illustrated in FIGS. 5–7 are performed for low density media.

FIGS. 5–7 illustrate a flowchart of the operational steps performed in the preferred embodiment of the spin-up sub-process of the present invention. FIGS. 8 and 9 are timing diagrams of the preferred spin-up sub-process for high and low density media, respectively. Referring to FIGS. 5–9, the spin-up sub-process of the present invention is described.

In the preferred embodiment of the present invention, the spin-up sub-process includes five operational periods. The first operational period is referred to as spindle acceleration period 800 for high-density media and first spindle acceleration period 900 for low-density media. During spindle acceleration period 800 and first spindle acceleration period 900, a spindle acceleration process 500 is performed. The second operational period is referred to as spindle settling period 802 for high-density media and first spindle settling period 902 for low-density media. During spindle settling period 802 and first spindle settling period 902, spindle settling process 600 is performed. The third operational period occurs when optical disk 306 consists of low-density media and is referred to as second spindle acceleration period 904. During second spindle acceleration period 904, second spindle acceleration process 704 is performed. The fourth operational period is also performed only when optical disk 306 is comprised of low-density media. The fourth operational period is referred to as second spindle settling period 906. During the second spindle settling period 906, a second spindle settling process 706 is performed. The fifth operational period is referred to as the final operational period 804 for high-density media and final operational period 908 for low-density media. During final operational period 804 and final operational period 908, final operational process 716 is performed.

Referring to FIGS. 5, 8, and 9, the first operational period of the spin-up sub-process is now described. The first operational period is associated with the portion of the spin-up sub-process wherein the spindle is initially rotated from a stationary position. Target operational speed 806 for high density media is 2400 revolutions per minute (RPM). The target operation speed 912 for low density media is 3600 RPM. This difference is due to the manner in which the sectors are positioned on optical disk 306. However, the density of optical disk 306 is not known at this point in the spin-up sub-process. Thus, in step 510, optical disk drive 300 initially accelerates optical disk 306 to 2400 RPM regardless of the type of media. Referring to FIG. 8, this is referred to as target operational speed 808 for high density media. Referring to FIG. 9, this is referred to as initial target operational speed 910 for low density media since optical disk must be at 3600 RPM to access data stored on low density media.

Once the spin-up sub-process has been invoked at start 502, spindle acceleration process 500 is performed. In step 510, the acceleration of optical disk 306 is performed. Here, spindle servo control system 336 in servo system 330 is initialized and commands motor 310 via communication medium 338 to start accelerating spindle 308 from the stationary position towards target operational speed 806 or initial target operational period 910.

As introduced above, a certain number of spin-up sub-process operations are not speed-dependent and therefore can be performed at virtually any time during the spin-up sub-process. Referring to FIG. 5, in the preferred embodiment of the present invention, three speed-independent operations are performed during the spindle acceleration process 500. In step 504 controller 322 turns on laser source 316 located in optics module 315. This is done via laser servo control system 352, including digital signal processor 335.

The second operation performed during spindle acceleration process 500 occurs at step 506. In step 506, controller 322 enables focus servo control system 332 in servo system 330 and instructs focus servo control system 332 to acquire and maintain focus of optical disk 306. Under the control of digital signal processor 335, focus servo control system 332 acquires and maintains focus of optical disk 306 by controlling focus actuator 323 via communication medium 338.

The third operation performed during spindle acceleration process 500 occurs at step 508. In step 508, controller 322 enables tracking servo control system 334 in servo system 330 and instructs tracking servo control system 334 to acquire and maintain tracking control of optical disk 306 under the control of digital signal processor 335, tracking servo control system 334 acquires and maintains tracking control of optical disk 306 by controlling fine tracking actuator 324 and coarse tracking actuator 326 via communication medium 338.

During spindle acceleration process 500, spindle 308 accelerates from zero RPM towards target operational speed 806 for high density media and initial target operational speed 910 for low density media. Spindle acceleration period 800 and first spindle acceleration period 900 are defined by the extent at which optical disk 306 oscillates about target operational speed 806 and initial target operational speed 910, respectively. This variation of optical disk speed is greater than a minimum speed variation threshold 814 and 918. In the preferred embodiment of the present invention, minimum threshold speed variance 814 and 918 is 0.2% of target operational speed 806 and initial target operational speed 910, respectively, or 2400 RPM±0.2%. Referring to FIGS. 8 and 9, variation window 808 during spindle acceleration period 800 and variation window 914 during first spindle acceleration period 900 indicate an optical disk speed variance of greater than ±0.2%. In addition, variation window 812 and variation window 910 indicate an optical disk speed variance of less than ±0.2%.

Referring to FIGS. 8 and 9, steps 504, 506, and 508 are performed at exemplary periods of time during spindle acceleration period 800 and first spindle acceleration period 900. Since the above operations are not dependent upon the speed and stability of optical disk 306, controller 322 may invoke the performance of steps 504, 506, and 508 at any point during spindle acceleration period 800 and first spindle acceleration period 900. As discussed above, there are certain spin-up sub-process operations which require optical disk oscillations to be maintained within tolerances which are lower than minimal threshold speed variation 814 and 918. Thus, in the preferred embodiment of the present invention, the operations performed at steps 504, 506, and 508 are performed as early as possible in the spin-up sub-process, preferably before minimum threshold speed variation 814 and 918 is achieved. That is, in the preferred embodiment, the operations performed by optical disk drive system 300 during spindle acceleration process 500 are performed at spindle speeds from 0 to 2400 RPM±0.2%. However, as one skilled in the relevant art would find apparent, steps 504, 506, and 508 may be performed at any time during the spin-up sub-process.

The time required to complete the operations conducted in steps 504, 506, and 508 is less than the time required for optical disk 306 to reach target operational speed 808 and initial target operational speed 910. That is, referring to FIG. 5, steps 504, 506, and 508 may complete prior to the completion of parallel step 510. Thus, in step 512, controller 322 determines whether spindle 308 is at minimum threshold speed variance 814 and 918. Spindle servo control system 336 sends this information via digital signal processor 335 and communication medium 354 to controller 322.

Minimum threshold speed variation 814 and 918 occurs approximately 0.9 seconds from the start of the spin-up sub-process. Thus, in the preferred embodiment of the present invention, spindle acceleration period 800 and first spindle acceleration period 900 complete in approximately 0.9 seconds.

When the minimum threshold speed variance 814 and 918 is achieved, controller 322 invokes the second operational period of the spin-up sub-process. This is shown in FIG. 5 by operational flow passing from FIGS. 5 to FIG. 6 through flowchart connector A 513.

Referring to FIGS. 6, 8, and 9, the second operational period of the spin-up sub-process of the present invention is now described. Referring to FIG. 8, the second operational period is referred to as spindle settling period 802 for high density media. Referring to FIG. 9, the second operational period is referred to as first spindle settling period 902 for low density media. This is because a second spindle settling occurs at a later point in the spin-up sub-process for low density media disks. During spindle settling period 802 and first spindle settling period 902, spindle settling process 600 is performed under the control of controller 322.

Controller 322 begins spindle settling process 600 when controller 322 detects that spindle oscillations have reached minimum threshold speed variation 814,918 (see step 512 of FIG. 5). As introduced above, a number of spin-up sub-process operations can be performed during optical disk oscillations which are slightly greater than the oscillations which are required to access data on optical disk 306. The variation in optical disk oscillations associated with accessing data on optical disk 306 is referred to as final variation threshold 816 for high density media and final variation threshold 922 for low density media. In the preferred embodiment of the present invention, final variation threshold 816 and 922 is ±0.1%. That is, spindle settling process 600 begins when the spindle speed is at 2400 RPM±0.2% and completes when spindle speed is at 2400 RPM±0.1%. This is illustrated in FIGS. 8 and 9, wherein variation window 810 and variation window 916 indicate an optical disk speed of greater than 2400 RPM±0.1%. In addition, variation window 812 and variation window 924 indicate an optical disk speed variance of less than 2400 RPM±0.1%.

Referring to FIG. 6, in step 608, spindle servo control system 336 in servo system 330 is instructed by controller 322 to continue the rotation of spindle 308 at target operational speed 806 for high density media and initial target operational speed 910 for low density media. While spindle servo control system 336 continues to control the optical disk speed and optical disk speed oscillations decrease from ±0.2% to ±0.1% of target operational speed 806 and initial target operational speed 910, controller 322 performs or invokes those operations which do not require optical disk speed oscillations to vary ±0.1% or less than target operational speed 806 and initial target operational speed 910. In the preferred embodiment of the present invention, three operations are performed during spindle settling process 600.

First, in step 602, controller 322 instructs read/write channel 340 to accept header information. The header information is used to adjust spin-up sub-process operations according to media type and to allow servo system 330 to maintain tracking position of the laser beam at the same radial position on optical disk 306.

The second operation performed during spindle settling process 600 occurs at step 604. In step 604, controller 322 reads header information from optical disk 306 to determine the type of media. This includes such characteristics as the media density (for example, high 1300 MB or low 650 MB) and sector size (for example, 1024 or 512 bytes). Capacity is determined by reading a sequence of headers from disk 306 and transferring this information to controller 322 via read/write channel 340. Controller 322 then reviews this information to determine the capacity of optical disk 306. Controller 322 determines sector size by measuring the time between headers. Controller 322 transfers the above-mentioned media characteristics to servo system 330 to be used for future servo operations (seeking, for example).

The third operation performed during spindle settling process 600 occurs at step 606. In step 606, initial calibrations are performed. In the preferred embodiment of the present invention, controller 322 invokes the calibration of the tracking gain during initial calibration step 606.

Since these operations are dependent upon the speed and stability of optical disk 306, steps 602, 604, and 606 must be performed at specific optical disk speeds and stability. In the preferred embodiment of the present invention, these operations are performed during spindle settling period 802 and first spindle settling period 902. That is, steps 602, 604, and 606 are performed after spindle speed and stability meet the minimum threshold variance of 2400 RPM±0.2%. This is illustrated in FIGS. 8 and 9, wherein the performance of steps 602, 604, and 606 are illustrated occurring during spindle settling period 802 and initial spindle settling period 902.

There are certain spin-up sub-process operations which require optical disk oscillations to be maintained at the final speed (that is, within variation window 812 and 924). To complete the spin-up sub-process as quickly as possible, in the preferred embodiment of the present invention, the operations performed at steps 602, 604, and 606 are performed before the target speed and stability are obtained. However, as a person skilled in the relevant art would find apparent, these operations may be invoked by controller 322 at other times during the spin-up sub-process. That is, the operations performed by controller 322 during spindle settling process 600 can be performed at any time while the optical disk speed ranges from 2400 RPM±0.2% to 2400 RPM±0.1%.

The time required to complete the operations conducted in steps 602, 604, and 606 is generally less than the time required for optical disk 306 to reach final variation threshold 816 for high density media and final variation threshold 922 for low density media. Referring to FIGS. 8 and 9, points along the timing diagrams illustrate exemplary periods at which these operations are performed. Due to the relative time duration between the performance of these operations and the settling of spindle 308, in step 610, controller 322 checks whether spindle 308 has reached final variation threshold 816 and 922. If not, controller 322 waits unit the necessary spindle settling has occurred. When the final threshold speed variance 816 and 822 is achieved, the third operational period of the spin-up sub-process occurs. This is shown in FIG. 6 as the operational flow passing from FIGS. 6 to FIG. 7 through flowchart connector B 612.

As introduced above, the third and fourth operational periods of the spin-up sub-process are performed only when optical disk 306 is a low density optical disk. Referring to FIGS. 7 and 9, the third and fourth operational periods of the spin-up sub-process are now described. Controller 322 previously received the density of optical disk 306 from read/write channel 340 during the recognize media type operation shown in step 604. In step 702, controller 322 determines if optical disk 306 is a low density media optical disk. If so, then the third operational period occurs at step 704 wherein optical disk 306 is accelerated to the target operational speed 912 of preferably 3600 RPM. This acceleration is referred to as the second spindle acceleration period 904. Second spindle acceleration process 704 is similar to spindle acceleration process 500 discussed above. However, during second spindle acceleration process 704, no operations are performed while low density optical disk 306 is accelerated. Low density optical disk 306 is accelerated in a manner similar to step 510.

Second spindle acceleration period 904 begins at the end of first spindle settling period 902. This point in the spin-up sub-process is illustrated in FIG. 9 as timing arrow 924, the point at which final threshold speed variation is achieved. Referring to FIGS. 8 and 9, this occurs approximately 1.2 seconds from the start of the spin-up sub-process of the present invention. Thus, spindle settling period 802 and final spindle settling period 902 have a time duration of approximately 0.3 seconds.

After the third operational period is completed and optical disk 306 has initially obtained target operation speed 912, the fourth operational period is performed at step 706. In step 706, second spindle settling process occurs. Similar to spindle settling process 600, optical disk 306 must again settle to within certain tolerances. Hence, this tolerance is associated with target operational speed 912. However, during second spindle settling process 706, no operations are performed in parallel with the settling of low density optical disk 306. Rather, optical disk 306 settles in a manner similar to step 608. Thus, during second spindle settling process 706, optical disk 306 settles to 3600 RPM±0.1%.

When second spindle settling period 906 completes, optical disk oscillations are at final threshold speed variation 922 of ±0.1% of target operational speed 912. Referring to FIG. 8, final operational period 804 occurs approximately 1.2 sec from the start of the spin-up sub-process. Referring to FIG. 9, final operational period 908 occurs approximately 1.4 seconds from the start of the spin-up sub-process. The additional time required for low density media is attributable to the third and fourth operational periods. Thus, third and fourth operational periods require approximately 0.2 seconds.

Referring to FIGS. 7-9, the fifth and final operational period of the spin-up sub-process of the present invention is described. The fifth operational period is referred to as final operational period 804 for high density media nd final operational period 908 for low density media. During final operations period 804 and final operations period 908, final operational process 716 is performed. Final operational process 716 includes the remaining preparatory operations and, once completed, disk 306 is prepared for data access (reading, writing, erasing). No further preparatory operations are required.

When final operational process 716 of the spin-up sub-process occurs, controller 322 instructs servo system 330 to continue the rotation of optical disk 306 at the target operational speed for the associated disk media. That is, optical disk 306 continues to spin at 2400 RPM±0.1% for high density media and at 3600 RPM±0.1% for low density media optical disk 306. This maintenance of optical disk speed and stability is performed in step 708. In step 708, spindle servo control system 336 is controlled by digital signal processor 335 to continue rotating spindle 308 at the target speed. In parallel with step 708, in step 710 controller 322 also instructs servo system 330 to perform final calibrations. These calibrations are speed dependent calibrations and must be performed when optical disk 316 is rotating at target operational speed 806 and target operational speed 912 with oscillations which are within final threshold speed variation 816 and 922, respectively.

The final calibrations include (1) calibrating the gain for tracking servo control system 334 and tracking actuators 324, 326 (if not already performed during initial calibration step 606); (2) setting the gain for read/write channel 340; (3) verify the ability to read/write/verify data; (4) calibrating the focus servo control system 332 and focus actuator 323 to achieve the optimum read signal; and (5) reading media specific information such as media type and location of media spares.

After the final calibrations are performed in step 710, the fifth operational period is completed, and optical disk 306 is maintained at target operational speed 806, 912 for data access functions. The spin-up sub-process is completed at step 714, thereby completing the load process of the optical disk drive. Thus, data may now be transferred between optical disk 306 and the requesting host processor.

The specific initial and final calibrations performed in steps 606 and 710 are well known to one skilled in the relevant art, and are further described in commonly owned U.S. Pat. Nos. 4,942,564 and 4,937,440, both to Hofer, et al., and U.S. Pat. Nos. 5,113,384 and 5,199,011, both to McDonald, et al., all of which are herein incorporated by reference in their entirety.

Final operational period 804 and final operational period 908 require approximately 0.3 seconds to be performed. Thus, final operational period 804 is completed at approximately 1.5 seconds, and final operational period 908, 1.7 seconds, from the start of the spin-up sub-process of the present invention.

Although the invention has been described and illustrated with a certain degree of particularity, it is understood that those skilled in the relevant art will recognize a variety of additional applications and appropriate modifications within the spirit of the invention and the scope of the claims.

What is claimed is:

1. A method for preparing an optical disk for data transfer in an optical disk drive system, comprising the steps of:

(A) accelerating the optical disk towards a target speed;

(B) concurrently with step (A), performing speed-independent optical disk drive preparatory operations including turning on a laser source of the optical disk drive system as soon as the optical disk begins to rotate;

(C) performing a first set of speed-dependent optical disk drive preparatory operations after the optical disk achieves a speed within a first variance of said target speed, wherein said first set of speed-dependent optical disk drive preparatory operations requires said optical disk speed to be within said first variance of said target speed; and (D) performing a second set of speed-dependent optical disk drive preparatory operations after the optical disk achieves a speed within a second variance of said target speed less than said first variance, wherein said second set of speed-dependent optical disk drive preparatory operations requires said optical disk speed to be within said second variance of said target speed.

2. The method of claim 1 wherein step (D) comprises the step of:

(1) performing final calibrations, wherein said final calibrations may be performed at an optical disk speed less than said target speed.

3. The method of claim 2 wherein step (D)(1) comprises the steps of:

(a) setting read/write channel gain;

(b) verifying data transfer operations;

(c) calibrating a focus servo control system and a focus actuator to achieve an optimum read signal; and (d) reading media specific information.

4. A method for preparing an optical disk for data transfer in an optical disk drive system, comprising the steps of:

(A) accelerating the optical disk towards a target speed;

(B) concurrently with step (A), performing speed-independent optical disk drive preparatory operations, wherein said speed-independent optical disk drive preparatory operations include:

(1) turning on a laser source of the optical disk drive system as soon as the optical disk begins to rotate;

(2) locking a focus servo control system to acquire and maintain focus of the optical disk; and (3) locking a tracking servo control system to acquire and maintain tracking control of the optical disk; and (C) performing a first set of speed-dependent optical disk drive preparatory operations after the optical disk achieves a speed within a first variance of said target speed, wherein said first set of speed-dependent optical disk drive preparatory operations requires said optical disk to be within said first variance of said target speed.

5. A method for preparing an optical disk for data transfer in an optical disk drive system, comprising the steps of:
   (A) accelerating the optical disk towards a target speed;
   (B) concurrently with step (A), performing speed-independent optical disk drive preparatory operations including turning on a laser source of the optical disk drive system as soon as the optical disk begins to rotate;
   (C) performing a first set of speed-dependent optical disk drive preparatory operations after the optical disk achieves a speed within a first variance of said target speed, wherein said first set of speed-dependent optical disk drive preparatory operations requires said optical disk speed to be within said first variance of said target speed, wherein said first set of speed-dependent disk drive preparatory operations comprise the steps of:
      (1) reading optical disk header information to determine optical disk media type; and
      (2) performing initial calibrations.

6. The method of claim 5, wherein said step (B) comprises the step of:
   (1) calibrating tracking gain.

7. The method of claim 5, further comprising the step of:
   (D) accelerating the optical disk to a second target operational speed faster than said target operational speed when said optical disk media type indicates the optical disk is comprised of a low density medium.

8. A method for storing and retrieving data in an optical disk library system adapted for storing a plurality of optical disks, at least one optical disk drive system, and an autochanger configured to transfer one of said plurality of optical disks between an associated storage location and a selected optical disk drive, and a controller for interfacing with a host processor and for controlling optical disk library operations, the method comprising the steps of:
   (A) receiving a data request from the host processor;
   (B) performing a disk selection and retrieval process by the autochanger under the command of the controller to position a selected optical disk into a selected optical disk drive; and
   (C) performing a load process by the selected optical disk drive, including the steps of:
      (1) performing a load disk sub-process to prepare the optical disk for acceleration in the optical disk drive; and
      (2) performing a spin-up subprocess to thereby make the disk immediately accessible to the host processor for data transfer, including the steps of:
         (a) accelerating the optical disk towards a target speed;
         (b) concurrently with step (C)(2) (a), performing speed-independent optical disk drive preparatory operations, including turning on a laser source of the optical disk drive system as soon as the optical disk begins to rotate;
         (c) performing a first set of speed-dependent optical disk drive preparatory operations after the optical disk achieves a speed within a first variance of said target speed, wherein said first set of speed-dependent optical disk drive preparatory operations requires said optical disk speed to be within said first variance of said target speed; and
         (d) performing a second set of speed-dependent operations after the optical disk achieves a speed within a second variance of said target speed less than said first variance, wherein said second set of speed-dependent optical disk drive preparatory operations requires said optical disk speed to be within said second variance of said target speed.

9. The method of claim 8, wherein said step (B) comprises the steps of:
   (1) positioning the autochanger adjacent to said selected optical disk;
   (2) retrieving said selected disk from the associated storage location;
   (3) positioning said selected optical disk adjacent to a selected optical disk drive; and
   (4) inserting said selected optical disk into an entry port of said selected optical disk drive.

10. The method of claim 8, wherein said step (C)(1) comprises the steps of:
   (a) loading said selected optical disk onto a spindle proximately located to said entry port of said selected optical disk drive; and
   (b) securing said selected optical disk onto a spindle in said selected optical disk drive.

11. A method for storing and retrieving data in an optical disk library system adapted for storing a plurality of optical disks, at least one optical disk drive system, and an autochanger configured to transfer one of said plurality of optical disks between an associated storage location and a selected optical disk drive, and a controller for interfacing with a host processor and for controlling optical disk library operations, the method comprising the steps of:
   (A) receiving a data request from the host processor;
   (B) performing a disk selection and retrieval process by the autochanger under the command of the controller to position a selected optical disk into a selected optical disk drive; and
   (C) performing a load process by the selected optical disk drive, including the steps of:
      (1) performing a load disk sub-process to prepare the optical disk for acceleration in the optical disk drive; and
      (2) performing a spin-up sub-process to thereby make the disk immediately accessible to the host processor for data transfer, including the steps of:
         (a) accelerating the optical disk towards a target speed;
         (b) concurrently with step (C)(2)(a), performing speed-independent optical disk drive preparatory operations, wherein said speed-independent optical disk drive preparatory operations include:
            (i) turning on a laser source of the optical disk drive system as soon as the optical disk begins to rotate,
            (ii) locking a focus servo control system to acquire and maintain focus of the optical disk, and
            (iii) locking a tracking servo control system to acquire and maintain tracking control of the optical disk; and
         (c) performing a first set of speed-dependent optical disk drive preparatory operations after the optical disk achieves a speed within a first variance of said target speed, wherein said first set of speed-dependent optical disk preparatory operations requires said optical disk to be within said first variance of said target speed.

12. The method of claim 11, wherein said step (B) comprises the steps of:
   (1) positioning the autochanger adjacent to said selected optical disk;
   (2) retrieving said selected disk from the associated storage location;
   (3) positioning said selected optical disk adjacent to a selected optical disk drive; and
   (4) inserting said selected optical disk into an entry port of said selected optical disk drive.

13. The method of claim 11, wherein said step (C)(1) comprises the steps of:
   (a) loading said selected optical disk onto a spindle proximately located to said entry port of said selected optical disk drive; and
   (b) securing said selected optical disk onto a spindle in said selected optical disk drive.

14. A method for storing and retrieving data in a optical disk library system adapted for storing a plurality of optical disks, at least one optical disk drive system, and an autochanger configured to transfer one of said plurality of optical disks between an associated storage location and a selected optical disk drive, and a controller for interfacing with a host processor and for controlling optical disk library operations, the method comprising the steps of:
   (A) receiving a data request from the host processor;
   (B) performing a disk selection and retrieval process by the autochanger under the command of the controller to position a selected optical disk into a selected optical disk drive; and
   (C) performing a load process by the selected optical disk drive, including the steps of:
   (1) performing a load disk sub-process to prepare the optical disk for acceleration in the optical disk drive; and
   (2) performing a spin-up sub-process to thereby make the disk immediately accessible to the host processor for data transfer, including the steps of:
      (a) accelerating the optical disk towards a target speed;
      (b) concurrently with step (C)(2)(a), performing speed-independent optical disk drive preparatory operations, including turning on a laser source of the optical disk drive system as soon as the optical disk begins to rotate;
      (c) performing a first set of speed-dependent optical disk drive preparatory operations after the optical disk achieves a speed within a first variance of said target speed, wherein said first set of speed-dependent optical disk preparatory operations requires said optical disk speed to be within said first variance of said target speed; wherein said first set of speed-dependent optical disk drive preparatory operations comprise the steps of:
         (i) reading optical disk header information to determine optical disk media type, and (ii) performing initial calibrations.

15. The method of claim 14, wherein said step (B) comprises the steps of:
   (1) positioning the autochanger adjacent to said selected optical disk;
   (2) retrieving said selected disk from the associated storage location;
   (3) positioning said selected optical disk adjacent to a selected optical disk drive; and
   (4) inserting said selected optical disk into an entry port of said selected optical disk drive.

16. The method of claim 14, wherein step (C)(1) comprises the steps of:
   (a) loading said selected optical disk onto a spindle proximately located to said entry port of said selected optical disk drive; and
   (b) securing said selected optical disk onto a spindle in said selected optical disk drive.

* * * * *